(12) United States Patent  
Bohler

(10) Patent No.: US 8,556,490 B1  
(45) Date of Patent: Oct. 15, 2013

(54) SYSTEMS, METHODS AND DEVICES FOR PROVIDING QUANTUM DOT LIGHTING SOLUTIONS

(75) Inventor: Christopher Lee Bohler, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 118 days.

(21) Appl. No.: 13/173,785

(22) Filed: Jun. 30, 2011

Related U.S. Application Data

(60) Provisional application No. 61/360,515, filed on Jul. 1, 2010.

(51) Int. Cl.  
*F21V 7/04* (2006.01)  
*G09F 13/04* (2006.01)

(52) U.S. Cl.  
USPC .......... 362/612; 362/97.1; 362/600; 362/605; 362/615; 362/617; 362/619

(58) Field of Classification Search  
USPC ................. 362/600–632, 97.1–97.4  
See application file for complete search history.

(56) References Cited

U.S. PATENT DOCUMENTS

| 5,746,493 | A * | 5/1998 | Jonsson et al. | 362/602 |
| 2004/0130912 | A1* | 7/2004 | Miyashita | 362/561 |
| 2005/0073826 | A1* | 4/2005 | Kuo | 362/26 |
| 2008/0084706 | A1* | 4/2008 | Roshan et al. | 362/601 |

* cited by examiner

*Primary Examiner* — Evan Dzierzynski  
*Assistant Examiner* — Danielle Allen  
(74) *Attorney, Agent, or Firm* — King & Spalding LLP

(57) ABSTRACT

A light module for providing an array of quantum dot disks and methods for manufacturing the same are described herein. The light module may include at least one light emitting diode (LED) light source in an edge lighting configuration emitting light into a waveguide, such as a frustrated total internal reflection (FTIR) waveguide. At least a portion of the waveguide includes a nanophosphor material, such as a quantum dot disk. Moreover, the waveguide includes at least one aperture on a surface of the waveguide optically aligned with the nanophosphor material. The light module further includes a lens optically aligned with the aperture of the waveguide, such as an over-optic. In alternative embodiments of the invention, the light module may includes at least one LED light source optically aligned with a quantum dot disk remotely located from the LED light source and optically aligned with an over-optic lens.

20 Claims, 5 Drawing Sheets

SYSTEMS, METHODS AND DEVICES FOR PROVIDING QUANTUM DOT LIGHTING SOLUTIONS

RELATED PATENT APPLICATION

This patent application claims priority under 35 U.S.C. §119 to U.S. Provisional Patent Application No. 61/360,515, titled "Systems, Methods and Devices for Providing Quantum Dot Lighting Solutions" and filed Jul. 1, 2010, the complete disclosure of which is hereby fully incorporated herein by reference.

TECHNICAL FIELD

The technical field relates generally to lighting solutions, and more particularly to systems, methods, and devices for providing quantum dot lighting solutions.

BACKGROUND

Many light fixtures have incorporated light emitting diode (LED) light sources to produce light efficiently. Typically, LED light sources utilize a phosphor layer to convert the light emitted from one or more LED sources to white light. The color temperature of the phosphor converted white light tends to be a cooler white than those of traditional, non-LED light sources. Recently, nanophosphors, such as material known as "quantum dot" material, have been used to convert the color temperature of light emitted from a light source to another color temperature.

One of the primary challenges faced by the effective use of quantum dot technology is the non-directional (lambertian) radiance of the design of current quantum dot emitters. Today, disks or wafers containing the quantum dot material may be greater than 1" in diameter. This large source is difficult to optically control in an efficient manner. What is described is a more controllable utilization of quantum dot emitters, allowing lighting fixture designers to make use of the color point capabilities offered by quantum dot technology as well as other benefits.

SUMMARY

According to an embodiment of the invention, there is disclosed a light module that includes at least one LED light source in an edge lighting configuration emitting light into a waveguide, wherein at least a portion of the waveguide can include a nanophosphor material, and wherein the waveguide can include at least one aperture on a surface of the waveguide optically aligned with the nanophosphor material. The light module also may include a lens optically aligned with the aperture of the waveguide.

In accordance with one aspect of the invention, the nanophosphor can be a quantum dot disk. According to another aspect of the invention, the lens can be an over-optic. In accordance with yet another aspect of the invention, the waveguide can be a frustrated total internal reflection (FTIR) waveguide. According to another aspect of the invention, the waveguide can include a plurality of apertures, wherein each of the plurality of apertures can be optically aligned with a lens. In accordance with yet another aspect of the invention, a surface between the nanophosphor material and lens can be highly reflective.

In accordance with another embodiment of the invention, there is disclosed a light module that includes at least one LED light source optically aligned with a quantum dot disk that can be remotely located from the LED light source, and a lens that can be optically aligned with both the quantum dot disk and LED light source. According to one aspect of the invention, at least one surface between the nanophosphor material and lens can be highly reflective. In accordance with another aspect of the invention, the light module can include a highly reflective surface interstitially imposed between the LED light source and the quantum dot disk so as to recycle the light that is not captured by the quantum dot disk in a single pass.

According to yet another embodiment of the invention, there is disclosed a method of manufacturing a light module that includes providing at least one LED light source in an edge lighting configuration that can emit light into a waveguide, where at least a portion of the waveguide can include a nanophosphor material, and where the waveguide can include at least one aperture on a surface of the waveguide optically aligned with the nanophosphor material. The method can further includes providing a lens optically aligned with the aperture of the wave guide.

BRIEF DESCRIPTION OF THE EXEMPLARY EMBODIMENTS

Having thus described the invention in general terms, reference will now be made to the accompanying drawings, which are not necessarily drawn to scale, and wherein:

FIGS. 1A and 1B present a cross-sectional view of a light module using a quantum dot array in a frustrated total internal reflection (FTIR) waveguide configuration in accordance with an example embodiment of the invention.

FIGS. 2A and 2B present a side view of a light module using a quantum dot array in an FTIR waveguide configuration in accordance with an example embodiment of the invention.

DETAILED DESCRIPTION OF EMBODIMENTS OF THE INVENTION

The exemplary embodiments are directed to the creation and use of quantum dot arrays. The systems and methods described herein may provide several advantages including the ability to provide more efficient and robust optical control capabilities of light emitted by light sources using quantum dot coatings (or film) to color-shift the emitted light. The systems, methods, and apparatuses described herein may also reduce the profile of an LED light source module and correspondingly reduce the depth necessary for an LED light source in a light fixture. Such utilization of quantum dot technology offers the promise of "on demand" white color point capability including, for example, converting cool white LED sources to warm white sources potentially with better efficiency than a direct, phosphor-converted LED lighting solution while maintaining a higher degree of optical control of the light emitted from the overall light module.

The exemplary embodiments of the invention now will be described more fully hereinafter with reference to the accompanying drawings, in which embodiments of the invention are shown. This invention may, however, be embodied in many different forms and should not be construed as limited to the exemplary embodiments set forth herein; rather, these exemplary embodiments are provided so that this disclosure will be thorough and complete, and will fully convey the scope of the invention to those skilled in the art. Like numbers refer to like elements throughout.

Figures 1A, 1B:
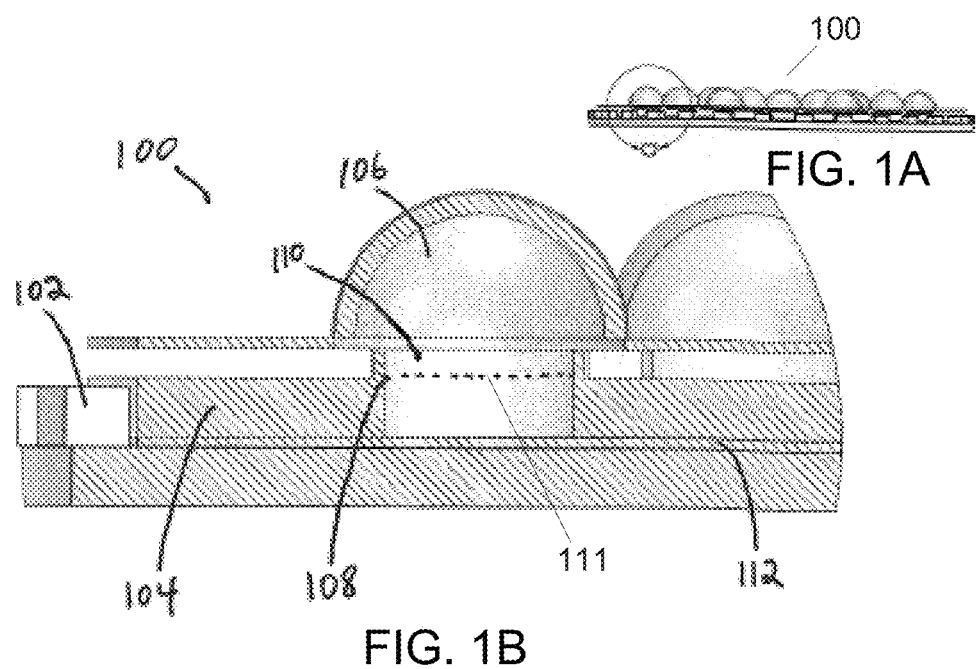

FIGS. 1A and 1B present a cross-sectional view of a light module 100 using a quantum dot array in a frustrated total internal reflection (FTIR) waveguide configuration in accordance with an example embodiment of the invention. As shown in FIG. 1B, light sources 102 (e.g., LED light emitters) are positioned on the edges of a waveguide 104 in an edge lit configuration. Depending on the application, these light sources 102 may be LED die or LED packages with a phosphor layer covering an LED die. The light source 102 may be set to emit a particular color temperature (e.g., ultraviolet, red, green, blue, white, or anything in between) depending on the application of the light. In the edge lit embodiment shown in FIG. 1B, a reflector plate 112 may make up the bottom surface of the waveguide 104 (or alternatively may be located below the waveguide 104). The waveguide 104 provides total internal reflection of the light emitted by the light source 102 with various locations of "frustrated" total internal reflection (FTIR) to redirect the light to exit the waveguide 104 at various apertures located in the top surface of the waveguide 104.

In the example embodiment shown in FIG. 1B, the waveguide 104 is an FTIR waveguide that includes apertures 108 in the top surface. In other embodiments the FTIR functionality may alternatively be provided by modifying one or more of the internal surfaces of the waveguide to "frustrate" the light and thereby redirect the light through an aperture on the top surface of the waveguide. In another example embodiment of the invention a volumetric material may be located in the light path of the waveguide 104 to "frustrate" the light and thereby redirect the light through an aperture on the top surface of the waveguide 104.

In an example embodiment of the invention, the apertures of the waveguide may be aligned with a quantum dot array that includes multiple quantum dot disks 110 that are positioned above the waveguide 104. In various embodiments of the invention, the quantum dot disk 110 may include quantum dot material inside the disk, or alternatively, the disk may have a layer (or film) of quantum dot material deposited on one or more of the disk surfaces converting the wavelength of the light emitted through the aperture 108 (e.g., the portion above the dotted line indicated in FIG. 1B). In an alternative embodiment of the invention, each quantum dot disk 110 may extend into the waveguide and extend above the waveguide (as shown in the example embodiment of FIG. 1 as the portions above and below the dotted line 111) thereby "frustrating" the light emitted by the light source 102 being transmitted down the waveguide 104 forcing the light rays to redirect through an aperture 108 while also converting the wavelength of the light emitted through the aperture 108. From the aperture 108 and quantum dot disk 110, the light rays are then passed through a lens 106 that in certain example embodiments is aligned over the corresponding aperture and quantum dot disk 110 of the quantum dot array. As shown in the embodiment of FIG. 1B, a light module may utilize quantum dot disk arrays with corresponding lens arrays, where the lens may be an over-optic selected for its particular distribution of light to allow for great flexibility in over optical control of the light emitted by the light module. By combining the quantum dot disk arrays with an LED edge-lit FTIR waveguide structure, the depth of the lamp or light engine may be reduced.

In addition, in certain example embodiments, overall optical efficiency of the system is improved by utilizing high reflectivity coatings or materials on the top surface of the aperture matrix 108 and/or the bottom surface of the lens array 106, interstitially between the lenses 106 and the quantum dot disks 110.

In alternative embodiments of the invention not shown in FIGS. 1A and 1B, the light source 102 may be in a back-lit configuration which would eliminate the need for a waveguide 104 as shown in FIG. 1. Highly reflective surfaces in the "cavity" between the quantum disk array and the lens array could again be used to improve efficiency and usage of the emitted light from the LED source that doesn't get passed through the quantum dot/lens system in a single pass.

Figures 2A, 2B:
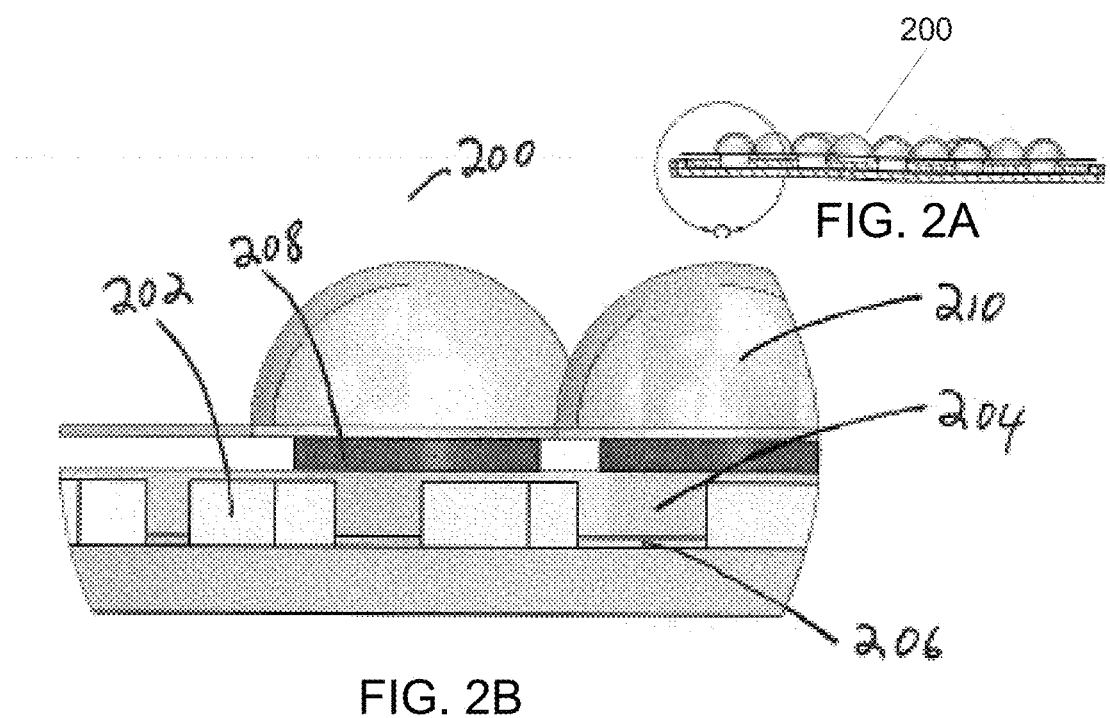

FIGS. 2A and 2B present a side view of a light module 200 using a quantum dot array in an FTIR waveguide configuration in accordance with an example embodiment of the invention. As shown in the example embodiment of the FIG. 2B, the edge-lit light sources (e.g., LED emitters) 202 shine light down a waveguide 204 located above a reflector 206. The waveguide 204 includes various apertures in the top side of the waveguide located such that the light being reflected through the waveguide 204 is directed through the aperture through the use of FTIR material or changes to a waveguide surface causing FTIR to redirect the light through the aperture. Above the aperture (or alternatively, filling the aperture) is a quantum dot disk 208 for converting the wavelength of the light directed through the aperture. An optic (or lens) 210 covers the aperture and quantum dot disk 208 to provide optical control of the converted light emitted from the quantum dot disk 208.

Figure 3:
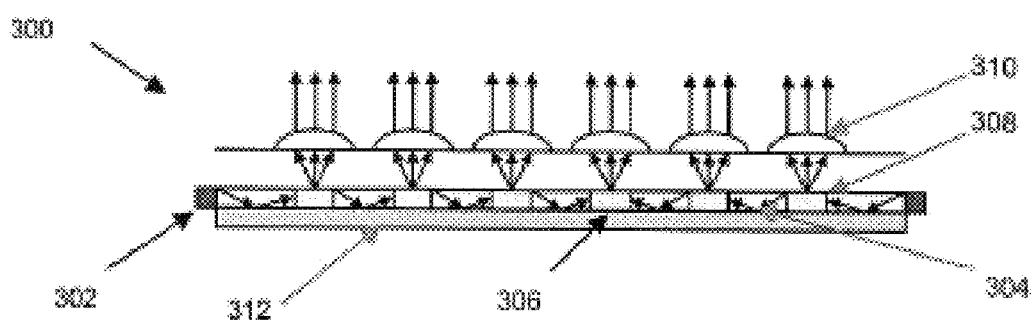
FIG. 3 is a cross sectional view of a light module using a quantum dot array in an FTIR waveguide configuration showing the path of the light emitted by the edge-lit light sources in accordance with an example embodiment of the invention.

FIG. 3 is a cross-sectional view of a light module 300 using a quantum dot array in an FTIR waveguide configuration showing the path of the light emitted by the edge-lit light sources 302 in accordance with an example embodiment of the invention. As shown in FIG. 3, the light travels down the waveguide 304 and undergoes FTIR when it hits some volumetric FTIR inducing material (e.g., a quantum dot disk or other material) 306 in the path of the waveguide 304 to redirect the light out of the waveguide 304 through an aperture 308 in the top surface of the waveguide 304 where the light can then be controlled by the lens (or optic) 310. In the example embodiment shown in FIG. 3, a reflector plate 312 may be proximal to the bottom surface of the waveguide 304.

Figure 4:
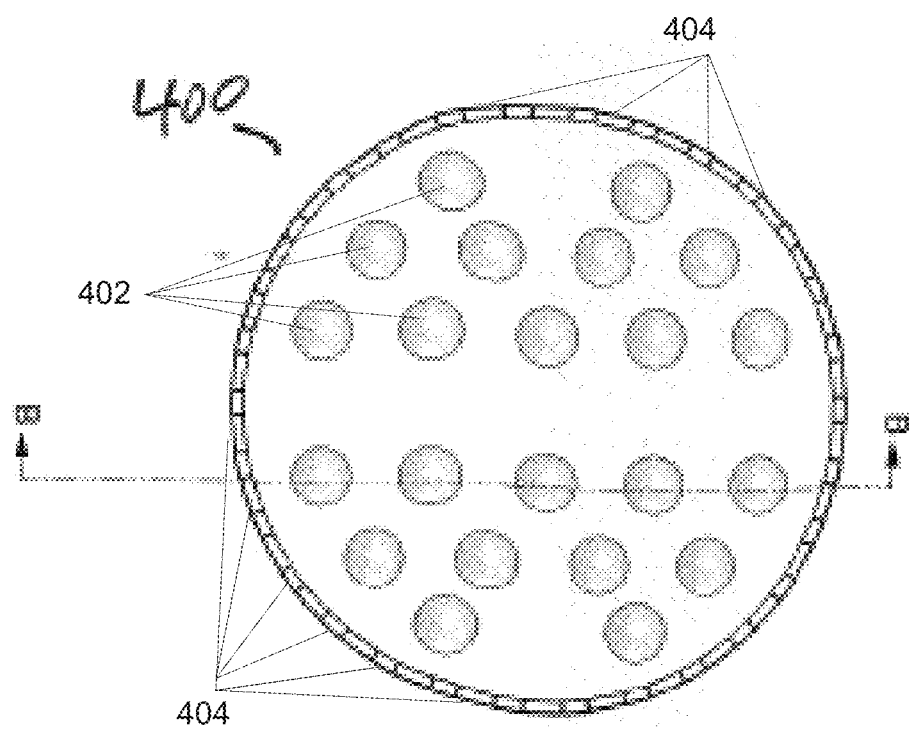
FIG. 4 illustrates a top view of a quantum dot disk array in accordance with one embodiment of the invention.

FIG. 4 illustrates a top view of a large "puck-like" structure or disk 400 containing light sources (e.g., LEDs) 404 on the edges and multiple quantum dot disks 402 disposed more centrally with regard to the light sources 404, in accordance with one embodiment of the invention. However, it will be recognized that various shapes are possible including but not limited to, square, rectangular, triangular, elliptical, circular, or other geometric shape. The quantum dot disks may be manufactured to correspond to lens arrays and/or LED arrays to allow for mass production of light modules utilizing arrays of individual lighting elements. By using quantum dot disks (or wafers) in arrays, the light beam emitted through these smaller disks will be easier to optically control via over-optics such as lenses, diffusers, etc.

Figure 5:
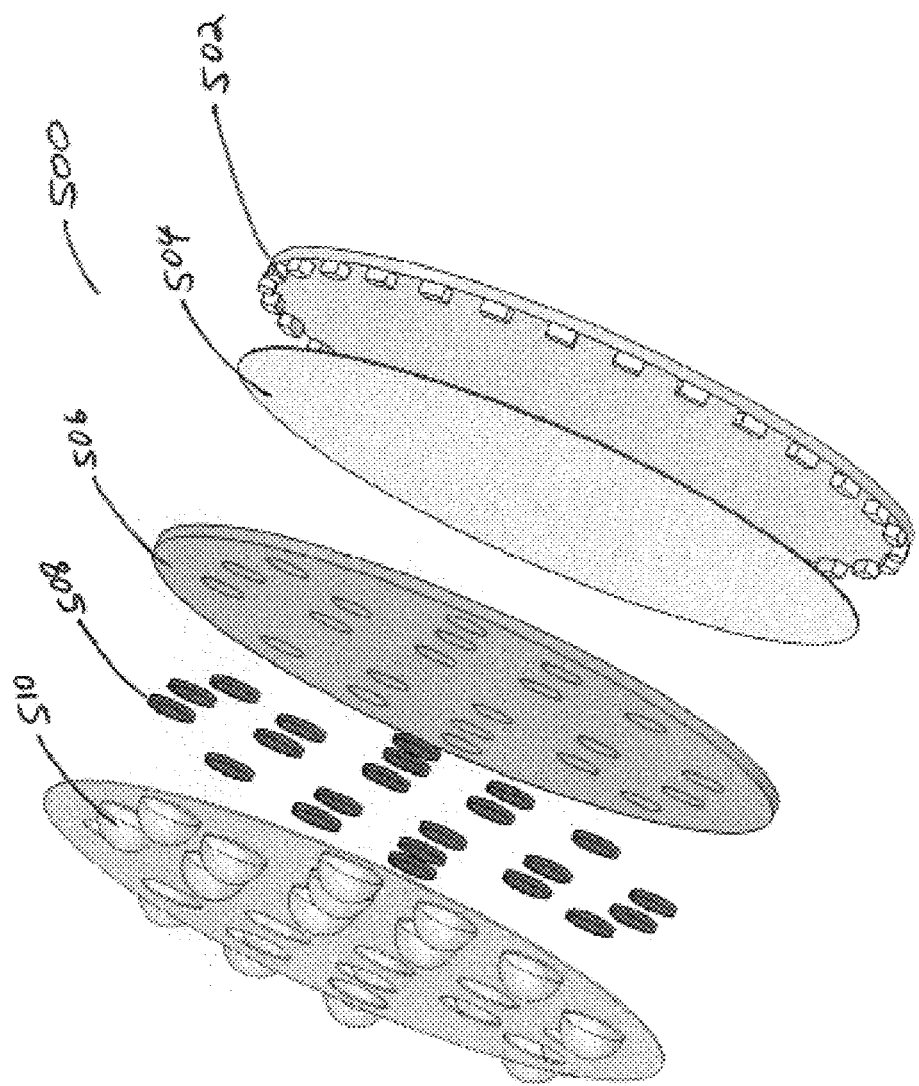
FIG. 5 is an exploded view of a quantum dot disk array in accordance with one embodiment of the invention.

FIG. 5 is an exploded view 500 of a quantum dot disk array in accordance with one example embodiment of the invention. As shown in the example embodiment of FIG. 5, the light source (e.g., LED emitter) layer 502 is proximal to the reflector layer (e.g., reflector plate) 504. The reflector layer 504 is proximal to the waveguide layer 506 containing apertures sized for coupling to quantum dot disks 508. The quantum dot disks 508 are covered with a lens (or over optic) layer 510. Although the disks in this embodiment are shown as separated, an alternate embodiment of the invention may utilize an integrated quantum dot array in which the nano-phosphors are embedded periodically in a single, homogeneous material in the form of a disk or film.

Accordingly, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A light module comprising:
   a waveguide comprising a top surface and an edge surface extending away from a perimeter of the top surface, the top surface including at least one aperture formed therein;
   a nanophosphor material optically and vertically aligned with a corresponding aperture;
   at least one light emitting diode (LED) light source in an edge lighting configuration emitting light into the waveguide; and
   a lens optically and vertically aligned with a corresponding aperture of the waveguide and the corresponding nanophoshor material, the lens covering the corresponding aperture and nanophosphor material.

2. The light module of claim 1, wherein the nanophosphor is a quantum dot disk.

3. The light module of claim 1, wherein the lens is an over-optic.

4. The light module of claim 1, wherein the waveguide is a frustrated total internal reflection (FTIR) waveguide.

5. The light module of claim 1, wherein the waveguide includes a plurality of apertures, wherein each of the plurality of apertures is optically and vertically aligned with a corresponding lens.

6. The light module of claim 1, wherein a surface between the nanophosphor material and the lens is highly reflective.

7. The light module of claim 1, wherein at least a portion of the nanophosphor material is positioned above the corresponding aperture that is optically and vertically aligned.

8. The light module of claim 1, wherein a bottom surface of the lens and the top surface of the waveguide forms a gap therebetween.

9. The light module of claim 1, wherein the aperture extends from within the waveguide to beyond the top surface of the waveguide.

10. The light module of claim 1, further comprising a reflector plate positioned proximally to a bottom surface of the waveguide, the bottom surface being positioned opposite the top surface of the waveguide.

11. A light module comprising:
    at least one light emitting diode (LED) light source;
    a quantum dot disk remotely located from the LED light source, the quantum dot disk being optically and vertically aligned with a corresponding LED light source; and
    a lens optically and vertically aligned with both the quantum dot disk and the LED light source, the lens covering the corresponding quantum dot disk.

12. The light module of claim 11, wherein at least one surface between the nanophosphor material and the lens is highly reflective.

13. The light module of claim 11, wherein the light module includes a highly reflective surface interstitially imposed between the LED light source and the quantum dot disk so as to recycle the light that is not captured by the quantum dot disk in a single pass.

14. A method of manufacturing a light module comprising:
    providing a waveguide comprising a top surface and an edge surface extending away from a perimeter of the top surface, the top surface including at least one aperture formed therein;
    positioning a nanophosphor material optically and vertically aligned with a corresponding aperture;
    positioning at least one light emitting diode (LED) light source in an edge lighting configuration emitting light into the waveguide; and
    providing a lens optically and vertically aligned with a corresponding aperture of the waveguide and the corresponding nanophoshor material, the lens covering the corresponding aperture and nanophosphor material.

15. The method of claim 14, further comprising providing a highly reflectivity coating on at least one of a top surface of the aperture, a bottom surface of the lens, or interstitially between the lens and the nanophosphor material.

16. The method of claim 14, wherein at least a portion of the nanophosphor material is positioned within the corresponding aperture that is optically and vertically aligned.

17. The method of claim 14, wherein at least a portion of the nanophosphor material is positioned above the corresponding aperture that is optically and vertically aligned.

18. The method of claim 14, wherein the aperture extends from within the waveguide to beyond the top surface of the waveguide.

19. The method of claim 18, wherein a top surface of the aperture facilitates forming a gap between a bottom surface of the lens and the top surface of the waveguide.

20. The light module of claim 1, wherein at least a portion of the nanophosphor material is positioned within the corresponding aperture that is optically and vertically aligned.

* * * * *